United States Patent
Dube

(10) Patent No.: US 11,822,826 B2
(45) Date of Patent: Nov. 21, 2023

(54) SENSOR STORAGE SYSTEM

(71) Applicant: Raytheon Company, Waltham, MA (US)

(72) Inventor: Russell E. Dube, Rutland, MA (US)

(73) Assignee: Raytheon Company, Waltham, MA (US)

(*) Notice: Subject to any disclaimer, the term of this patent is extended or adjusted under 35 U.S.C. 154(b) by 214 days.

(21) Appl. No.: 16/796,196

(22) Filed: Feb. 20, 2020

(65) Prior Publication Data

US 2021/0263652 A1    Aug. 26, 2021

(51) Int. Cl.
| | |
|---|---|
| *G06F 3/06* | (2006.01) |
| *G01S 13/02* | (2006.01) |
| *G06F 1/20* | (2006.01) |
| *G06F 13/42* | (2006.01) |
| *H04L 12/06* | (2006.01) |
| *H04L 49/356* | (2022.01) |

(52) U.S. Cl.
CPC .............. *G06F 3/067* (2013.01); *G01S 13/02* (2013.01); *G06F 1/20* (2013.01); *G06F 3/0613* (2013.01); *G06F 3/0646* (2013.01); *G06F 3/0688* (2013.01); *G06F 13/4282* (2013.01); *H04L 12/06* (2013.01); *H04L 49/358* (2013.01); *G06F 2200/201* (2013.01); *G06F 2213/0026* (2013.01)

(58) Field of Classification Search
CPC .......... G01S 13/02; G06F 1/20; G06F 3/0613; G06F 3/0646; G06F 3/067; G06F 3/0688; G06F 13/4282; H04L 12/06; H04L 49/358

See application file for complete search history.

(56) References Cited

U.S. PATENT DOCUMENTS

| | | | | |
|---|---|---|---|---|
| 2010/0049821 A1* | 2/2010 | Oved | ...................... | G06F 9/542 709/212 |
| 2012/0120603 A1* | 5/2012 | Campbell | ................. | G06F 1/20 361/698 |
| 2013/0132582 A1* | 5/2013 | Kim | ....................... | G06Q 10/06 709/226 |
| 2013/0282853 A1* | 10/2013 | Jun | ......................... | G06F 9/544 709/213 |

(Continued)

FOREIGN PATENT DOCUMENTS

WO   WO-2021166227 A1   8/2021

OTHER PUBLICATIONS

"FLIR pHSDR", FLIR Systems, Inc., (Accessed Feb. 26, 2020), 20 pgs.

(Continued)

*Primary Examiner* — Jeong S Park
(74) *Attorney, Agent, or Firm* — Schwegman Lundberg & Woessner, P.A.

(57) ABSTRACT

A storage system for sensor data includes a plurality of storage modules coupled together via a network fabric, each storage module including a plurality of form factor non-volatile memory (NVMe) storage units. The system also includes an integrated processor coupled to the network fabric and storage modules. The integrated processor is configured for control functions and data processing. The integrated processor configuration includes instructions such that the plurality of storage devices receive data via a data centric publish subscribe (DCPS) notification followed by a remote direct memory access (RDMA) transfer.

18 Claims, 4 Drawing Sheets

(56) References Cited

U.S. PATENT DOCUMENTS

| | | | |
|---|---|---|---|
| 2014/0201562 A1* | 7/2014 | Breakstone | G06F 1/30 |
| | | | 713/600 |
| 2014/0310457 A1* | 10/2014 | Chambliss | G06F 11/1076 |
| | | | 711/170 |
| 2015/0067059 A1* | 3/2015 | Sanchez | H04L 41/00 |
| | | | 709/204 |
| 2015/0254003 A1 | 9/2015 | Lee et al. | |
| 2018/0068206 A1* | 3/2018 | Pollach | G06V 20/56 |
| 2019/0349929 A1* | 11/2019 | Soro | H04L 67/535 |
| 2020/0019433 A1* | 1/2020 | Qiu | G06F 9/4831 |
| 2020/0097054 A1* | 3/2020 | Lin | G06F 13/4081 |

OTHER PUBLICATIONS

"Galleon Embedded Computing", Galleon Products, (Accessed Feb. 26, 2020), 17 pgs.
"High-Speed, Sensor Recorders", Curtiss-Wright Defense Solutions, (Accessed Feb. 26, 2020), 1 pg.
"Talon RTR 2555 1-, 10-, 40-Gigabit Ethernet Rugged SFF Recorder", Pentek, Inc, (Accessed Feb. 26, 2020), 2 pgs.
"International Application Serial No. PCT/US2021/018748, International Search Report dated Jun. 22, 2021", 4 pgs.
"International Application Serial No. PCT/US2021/018748, Written Opinion datd Jun. 22, 2021", 6 pgs.
"International Application Serial No. PCT/US2021/018748, International Preliminary Report on Patentability dated Sep. 1, 2022", 8 pgs.

\* cited by examiner

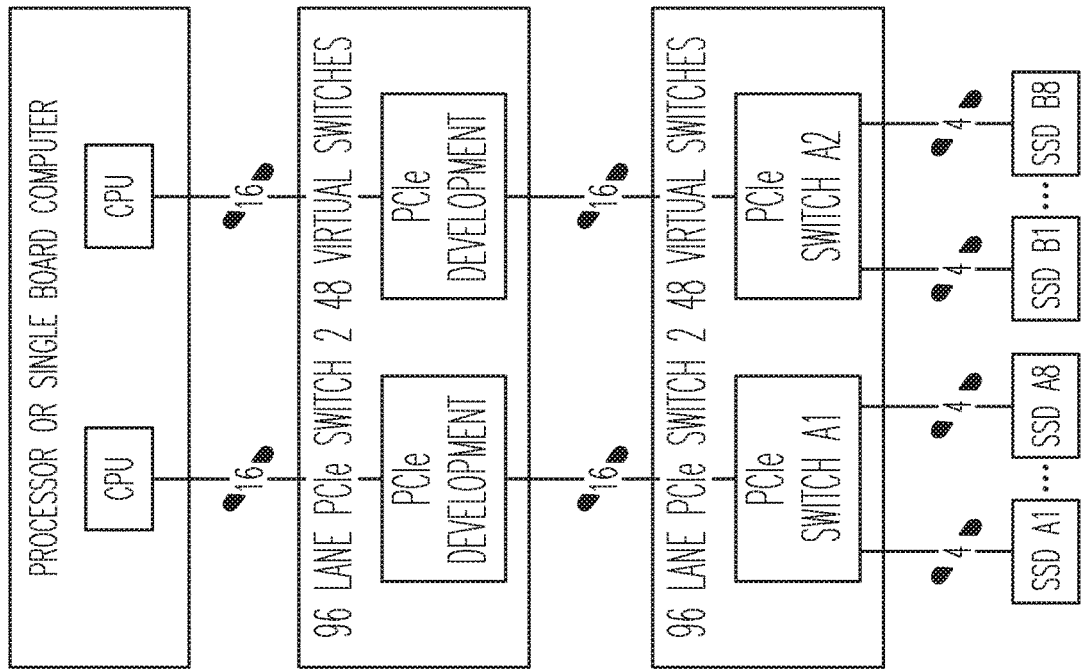
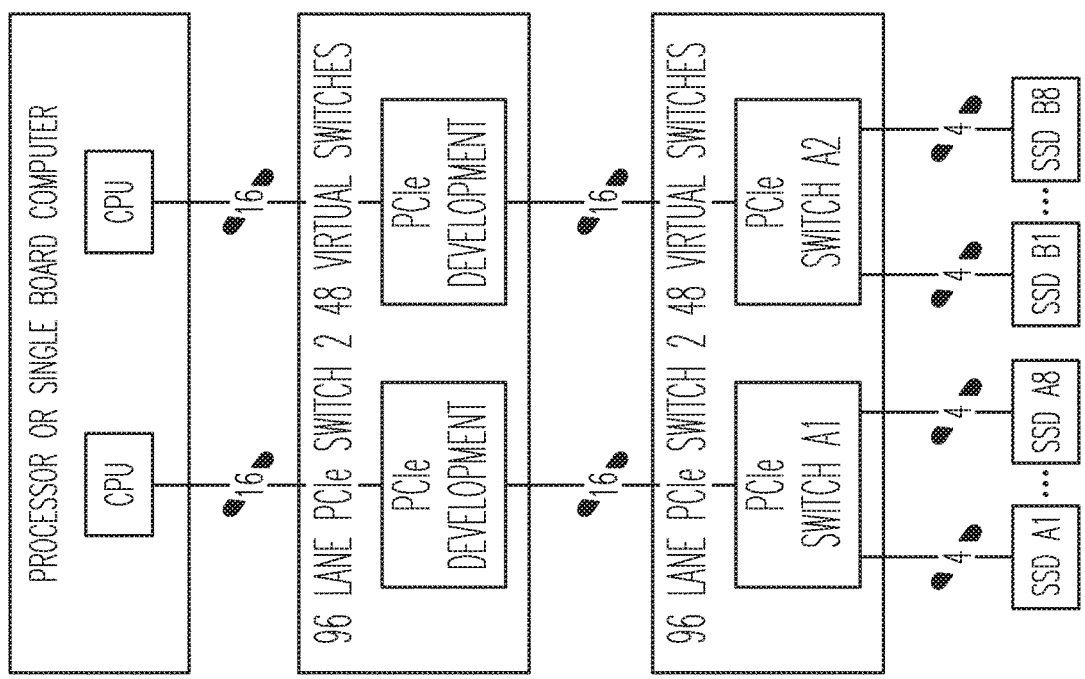
Fig. 5

SENSOR STORAGE SYSTEM

TECHNICAL FIELD

Embodiments described herein generally relate to a sensor storage system, and in an embodiment, but not by way of limitation, a sensor storage system that is made up of removable storage elements of non-volatile memory storage modules interconnected to a network fabric.

BACKGROUND

Modern sensor systems (e.g., radar systems) are challenged to provide cluster fabric-enabled storage having write rate capabilities and capacities that are sufficient to record and store sensor data in real time for extended periods. The aggregate data rates that must be supported by such storage systems are a function of the number of data sources, the streaming rate of the digitized data, and the additional processed data that must also be collected.

Prior methods of meeting high speed recording and storage needs have typically used hard drives, or solid-state drives in RAID (redundant array of independent discs) configurations on conventional storage interfaces (SATA (serial advanced technology attachment) or SAS (serial attached SCSI (small computer system interface)))) to produce the aggregate data rates and capacities required. These systems manifest themselves as direct-attached storage or network-attached storage driven by a single board computer (SBC) or server system. Software running on the SBC or server provides a means of receiving the sensor data and writing that data to the storage array. Rugged solutions exist, but they have limitations in their connectivity, capacity, supported data rates, and ability to support removable media. These prior solutions are challenged to provide both high performance computing (HPC) fabric and Ethernet fabric integration, both of which can support remote direct memory access (RDMA) methods, and the evolving size, weight, and power needs at extended temperatures and in ground mobile environments.

Simply put, there are no available rugged data recording and boot solutions that can connect directly to RDMA-enabled cluster and network fabrics, support removable solid-state non-volatile memory (NVMe) media, and meet challenging data rate and environmental requirements.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 5 is an example of a manner in which several PCI data busses can be used to maximize storage.

DETAILED DESCRIPTION

Figure 1:
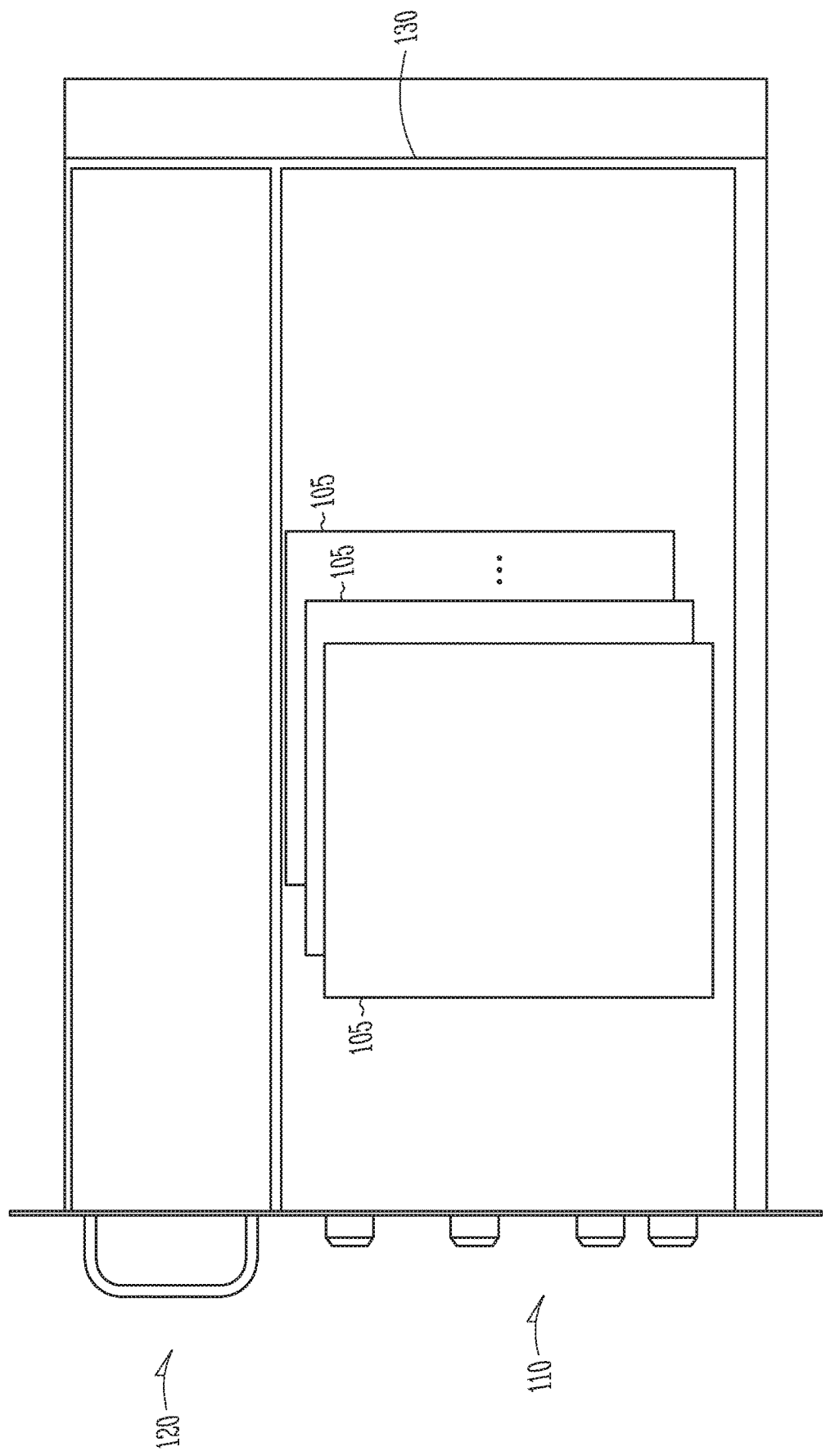
FIG. 1 is an illustration of a storage module and controller module combination.

One or more embodiments relate to a sensor storage system, and in particular, a sensor storage system that is made up of removable storage elements of non-volatile memory storage modules interconnected to a network fabric.

In an embodiment, a Sensor Storage Subsystem (SSS) provides a cartridge, module, or unit that includes a removable or fixed (e.g., soldered-down integrated circuits) set of storage elements composed of non-volatile memory express NVMe M.2 and/or U.2 form factor modules (and future form factor modules) and/or ruler form factor modules, interconnected on a PCIe (peripheral component interconnect express) fabric, sourced by an integrated processing system providing direct connection to a cluster fabric performing sensor (e.g., radar) signal and data processing. An SSS embodiment operates at extended temperatures making it suited for demanding ground mobile radar deployments. An SSS embodiment also supports the encryption of source data and system initialization (boot). Data writing capacity and rates can be arbitrarily scaled to meet requirements by interconnecting one or more SSS's and by utilizing data centric publish subscribe (DCPS) mechanisms and remote direct memory access (RDMA) transfers to allocate capacity and write rate. The M.2 and/or U.2 modules and NVMe infrastructure use a PCIe interconnect structure that provides high write data rates and capacity in a compact package.

An embodiment has the capability to provide an integrated (multiple type) cluster fabric attached into an extended-temperature, rugged, and modular storage system. The system uses a cartridge containing removable NVMe solid state devices as a scalable solution for sensor data storage. The system provides extendable, software-controlled capabilities that are integrated into a unit support boot, system initialization, and encryption of data.

An embodiment provides a configurable and scalable high-speed data recording and system initialization mechanism that can operate directly on a cluster fabric such as InfiniBand or RoCE (RDMA over Converged Ethernet), and provides Network Attached Storage (NAS) via Ethernet or RoCE. It can be provisioned for various forms of solid-state storage in removable media cartridges or modules. It is a liquid and/or air-cooled rugged solution for demanding environments. The modular design implementation uses standard single board computer designs running a Linux operating system. The solid-state storage options that are available include M.2, U.2, and ruler form factor (e.g., Enterprise and Data Center SSD Form Factor (EDSFF)) NVMe devices. Additionally, encryption is supported. Capacity can be increased by attaching external electrical connectors across units. In addition, this feature also allows for different storage form factors to be used simultaneously.

Data are transferred from one or more hosts to the SSS using mechanisms based on Data Centric Publish Subscribe (DCPS) notification messages followed by RDMA transfers made by the SSS to acquire the data. The software contained within the SSS moves these data to the storage devices of the SSS using operations to maximize the number of devices written to in order to provide high write-rate capabilities necessary for the collection of sensor data, for example, by utilizing multiple PCIe data busses. The configuration of the SSS allows, in the alternative, traditional NAS operation for lower demand collection needs. Ethernet, RoCE, and InfiniBand are supported network and fabric options. Software configuration over a network allows for dynamic and static partitioning and volume configuration of the storage. Off-load of the data is provided using the same means in read modes as provided for in collection modes. Specifically, the SSS can be configured to generate notification messages to external hosts and source the previously stored data via RDMA to these hosts over the fabric or operate as Network Attached Storage (NAS) using conventional means such Network File System (NFS) to enable offloading of data.

In summary, an embodiment of the sensor storage subsystem (SSS) permits multiple storage modules to be attached to a cluster fabric. The SSS supports multiple types of fabric interfaces, and supports multiple form factors of NVMe storage using different tray configurations. The SSS can include one or more of an OpenVPX or other standard form factor replaceable/upgradable controllers. The SSS is scalable (both upwards and downwards) in capacity and in performance. The SSS uses DCPS mechanisms followed by remote direct memory access (RDMA) data transfers over a cluster fabric interconnect. Network attached storage operation (e.g., NFS) is also supported simultaneously. The SSS offers an SBC solution for controllers that makes the controllers upgradeable to future processing technologies and fabric interconnects as well as being able to support other storage technologies. The SSS is scalable in capacity and in performance by using multiple units and connecting those units together using an external PCIe fabric. The trays or units in the SSS are replaceable, which allows alternate solid-state drive (SSD) form factors to be used for each scalable recorder element.

Figure 2:
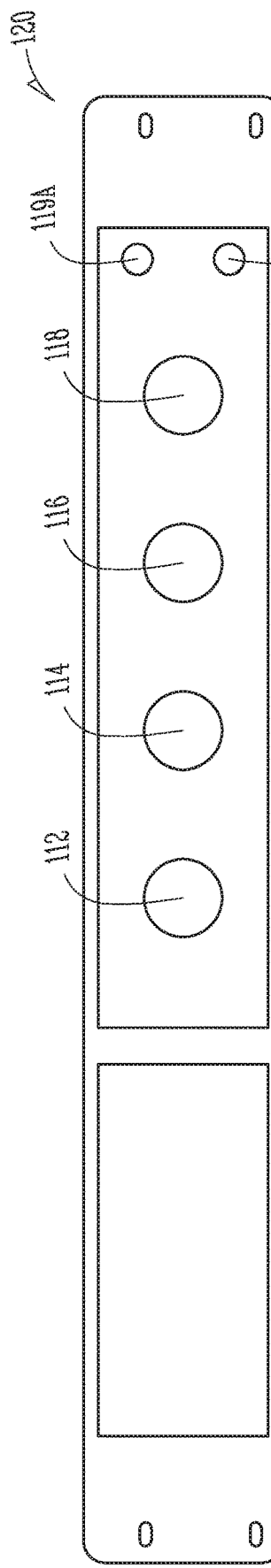
FIG. 2 is an illustration of a single storage module.
Figure 3:
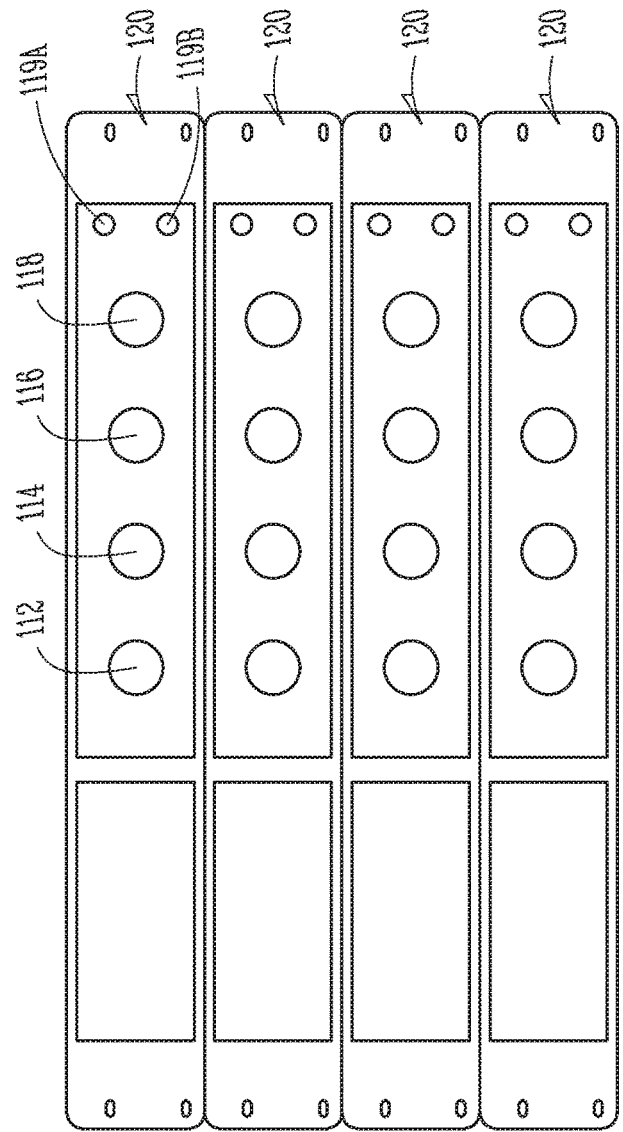
FIG. 3 is an illustration of a stack of storage modules.

An example embodiment of a sensor storage subsystem (SSS) is illustrated in FIGS. 1, 2, 3, and 4. FIG. 1 illustrates a side view of an SSS including a controller module 110 that includes a processor 105, a storage module 120, and a backplane 130. FIG. 2 illustrates an example of a front view of a single storage module 120, which supports multiple types of fabric interfaces such as InfiniBand 112 and Ethernet 114. A PCIe expansion port 118 is also provided. A power port/input 116 is present. In an embodiment, the unit is liquid-cooled via a coolant-in port 119A and a coolant-out port 119B. The cooling system can be an air-based cooling system, a liquid-based cooling system, or a combination of an air-based and liquid-based cooling system. FIG. 3 illustrates several storage modules 120 in a stacked arrangement.

Figure 4:
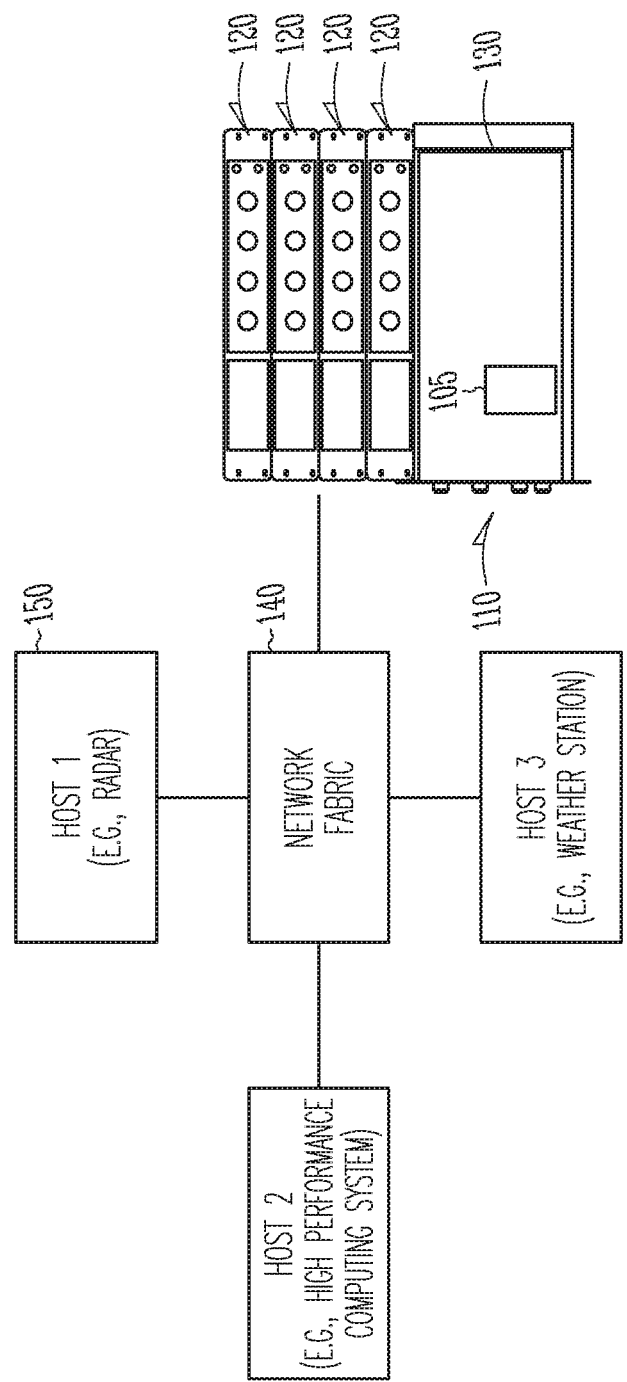
FIG. 4 is an illustration of a stack of storage modules, a controller module, and a network fabric.

FIG. 4 illustrates a further embodiment of the SSS of FIGS. 1, 2, and 3. In FIG. 4, a plurality of storage modules 120 is coupled together and coupled to a network fabric 140. In an embodiment, the storage modules 120 and the control module 110 are independently removable. Also, the storage modules 120 are more often removed than the control module 110. Therefore, since it is less complex to disconnect air-cooled connections than it is to disconnect liquid-cooled connections, the storage modules 120 are typically air-cooled rather that liquid-cooled. Access to network fabrics is typically done using a network switch, however it is possible to use point-to-point connections for some use cases. The network fabric includes a plurality of hosts from which the SSS collects and processes sensor data. Hosts can include such devices as radar units, computing complexes that use a network fabric (such as computing complexes that are used in High Performance Computing (HPC) systems), and/or in systems that utilize network-connected computing clusters, such as computing systems that are used in weather forecasting, and science and research applications. Each storage module 120 includes a plurality of form factor non-volatile memory (NVMe) storage units or soldered-down integrated circuits. The storage modules 120 can include one or more NVMe M.2 or U.2 modules. The network fabric 140 can include a peripheral component interconnect express (PCIe) fabric. Additionally, the network fabric 140 can include Ethernet 114, remote direct memory access (RDMA) over Converged Ethernet (RoCE), or InfiniBand 112.

FIG. 4 further illustrates a manner in which a processor 105 is integrated into a control module 110, and further how the processor 105 can be coupled to the network fabric 140 and storage modules 120. In an embodiment, the integrated processor 105 is configured for control functions and data processing. Specifically, the integrated processor configuration includes instructions such that the plurality of storage devices receive data via a data centric publish subscribe (DCPS) notification, and the DCPS notification is followed by a remote direct memory access (RDMA) transfer to the SSS processors. The SSS processors then optionally encrypt and/or directly store the captured data to storage devices in the storage module. In another embodiment, the integrated processor can also be configured for booting the system, initializing the system, and encrypting the sensed data.

As noted above, the SSS can be useful in collecting sensed data from a radar system. In other embodiments, the SSS can be used as a storage system in any computing complex that uses a network fabric, such as computing complexes that are used in High Performance Computing (HPC) systems, and/or in systems that utilize network-connected computing clusters, such as computing systems that are used in weather forecasting, and science and research applications.

In another embodiment, the integrated processor includes instructions for dynamic partitioning, static partitioning, and/or volume configuration. For example, software executing on the integrated processor(s) can determine how to allocate storage capacity. The software can execute this in several ways. It can be executed statically at system initialization from predetermined configuration files. It can also be executed dynamically while the SSS is actively processing data to be stored. In both cases, the software may designate and use portions of the total amount of storage available and collect these portions into volumes, and these volumes are used as the storage units for allocation. Remote control and configuration of the SSS is accomplished using one or more of the available network connections (e.g., Ethernet or InfiniBand) and a protocol determined to be acceptable to the SSS and the host(s) (e.g., a radar system or other computing complex).

In another embodiment, the integrated processor includes instructions for maximizing the number of the storage modules to which data are written. In one instance, several PCIe data busses can be used to maximize storage. An example is illustrated in FIG. 5. Another feature of the SSS is its ability to maximize the data write rate to available storage. This maximizing can be accomplished using software executing on the integrated processors, which distribute data across several storage devices to effectively improve write rate performance by parallelizing write operations. This is executed in a manner that does not require specific (storage system) formatting of the storage devices as might be the case if traditional RAID mechanisms were used. This enables data recovery to be accomplished using ordinary file reading mechanisms provided by the host (e.g., radar) operating system. The number of devices used can be determined by the SSS software or preconfigured by configuration files.

In another embodiment, the SSS is configured to permit network-attached storage for lower demand collection needs. That is, the storage modules can be partitioned according to each particular use case. For example, the SSS can be configured to behave as traditional network-attached storage using IP protocols (e.g., NFS). The SSS software incorporates this feature, and it is configurable to be used in conjunction with other operations that are executed by the SSS (e.g., DCPS/RDMA) simultaneously. The SSS is then able to allocate storage amounts to be used for different types of storage access methods on more than one network connection at a time.

Examples, as described herein, may include, or may operate on, logic or several components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part of or all operations described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A storage system for radar sensor data comprising:
   a plurality of storage modules coupled together via a network fabric, each storage module comprising a plurality of form factor non-volatile memory (NVMe) storage units; and
   an integrated processor coupled to the network fabric and storage modules, the integrated processor configured for sensing streamed radar data and radar data processing;
   wherein the integrated processor configuration comprises instructions such that the plurality of storage devices receives data via a data centric publish subscribe (DCPS) notification, thereby providing locations of the radar data, followed by a remote direct memory access (RIMA) transfer to acquire the radar data, thereby utilizing capacity and maximizing write-rate efficiency of a collective data recording function performed by the storage system; and
   wherein the integrated processor comprises instructions for maximizing a number of the storage modules to which the radar data are written.

2. The system of claim 1, wherein the system comprises a radar system.

3. The system of claim 1, wherein the storage modules comprise one or more of an NVMe M.2 or U.2 module, a ruler form factor module, or soldered-down components, and the network fabric comprises a peripheral component interconnect express (PCIe) fabric.

4. The system of claim 1, wherein the integrated processor is configured for one or more of booting the system, initializing the system, and encrypting data.

5. The system of claim 1, comprising a cooling system coupled to the storage modules and the integrated processor.

6. The system of claim 5, wherein the cooling system comprises one or more of a liquid-cooled system and an air-cooled cooling system.

7. The system of claim 6, wherein the air-cooled system is configured for cooling the plurality of storage modules and the liquid-cooled system is configured for cooling the integrated processor.

8. The system of claim 1, wherein the integrated processor configuration comprises instructions for one or more of dynamic partitioning, static partitioning, and volume configuration.

9. The system of claim 1, wherein the system is configured to permit network-attached storage for lower demand collection needs.

10. The system of claim 1, wherein the network fabric comprises one or more of Ethernet, remote direct memory access (RDMA) over Converged Ethernet (RoCE), and InfiniBand.

11. The system of claim 1, wherein the plurality of storage modules is configured for coupling to external storage modules via a peripheral component interconnect express (PCIe) fabric, thereby expanding capacity or data rate of the storage system.

12. A process comprising:
receiving radar sensor data into a sensor storage system via a data centric publish subscribe (DCPS) notification; and
after receiving the radar data via the DCPS notification, transferring the radar data via a remote direct memory access (RDMA) to an integrated processor in the sensor storage system;
wherein the sensor storage system comprises a plurality of storage modules coupled together via a network fabric, each storage module comprising a plurality of form factor non-volatile memory (NVMe) storage units;
wherein the integrated processor is coupled to the network fabric and storage modules and is configured for sensing streamed radar data and radar data processing; and
wherein the integrated processor comprises instructions for maximizing a number of the storage modules to which the radar data are written.

13. The process of claim 12, wherein the storage modules comprise one or more of an NVMe M.2 or U.2 module, a ruler form factor module, or soldered-down components, and the network fabric comprises a peripheral component interconnect express (PCIe) fabric.

14. The process of claim 12, comprising booting the sensor storage system, initializing the sensor storage system, or encrypting data in the sensor storage system using the integrated processor.

15. The process of claim 12, wherein a cooling system is coupled to the storage modules and the integrated processor; wherein the cooling system comprises one or more of a liquid-cooled system and an air-cooled cooling system; and wherein the air-cooled system is configured for cooling the plurality of storage modules and the liquid-cooled system is configured for cooling the integrated processor.

16. The process of claim 12, comprising executing a dynamic partitioning, a static partitioning, or a volume configuration in the sensor storage system.

17. The process of claim 12, comprising permitting network-attached storage for lower demand collection needs.

18. The process of claim 12, comprising coupling external storage modules via a peripheral component interconnect express (PCIe) fabric, thereby expanding capacity or data rate of the storage system.

* * * * *

UNITED STATES PATENT AND TRADEMARK OFFICE
CERTIFICATE OF CORRECTION

PATENT NO. : 11,822,826 B2
APPLICATION NO. : 16/796196
DATED : November 21, 2023
INVENTOR(S) : Russell E. Dube Page 1 of 1

It is certified that error appears in the above-identified patent and that said Letters Patent is hereby corrected as shown below:

On the Title Page

In Column 2, under item (56) "Foreign Patent Documents", Line 1, delete "WO-2021166227 A1" and insert --WO-2021168227 A1-- therefor On page 2, in Column 1, under item (56) "Other Publications", Line 10, delete "datd" and insert --dated-- therefor In the Claims In Column 6, Line 49, In Claim 1, delete "(RIMA)" and insert --(RDMA)-- therefor Signed and Sealed this
Seventh Day of January, 2025

Derrick Brent
*Acting Director of the United States Patent and Trademark Office*